US012731901B2

(12) United States Patent
Yahata et al.

(10) Patent No.: US 12,731,901 B2
(45) Date of Patent: Sep. 8, 2026

(54) PLANAR ANTENNA

(71) Applicant: Sumitomo Electric Industries, Ltd., Osaka (JP)

(72) Inventors: Yusuke Yahata, Osaka (JP); Ichiro Kuwayama, Osaka (JP); Suguru Yamagishi, Osaka (JP); Yutaro Miki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/728,610

(22) PCT Filed: Sep. 22, 2022

(86) PCT No.: PCT/JP2022/035468
§ 371 (c)(1),
(2) Date: Jul. 12, 2024

(87) PCT Pub. No.: WO2023/135867
PCT Pub. Date: Jul. 20, 2023

(65) Prior Publication Data

US 2025/0105520 A1 Mar. 27, 2025

(30) Foreign Application Priority Data

Jan. 14, 2022 (JP) ................................ 2022-004158

(51) Int. Cl.
*H01Q 9/04* (2006.01)

(52) U.S. Cl.
CPC ................................ *H01Q 9/0457* (2013.01)

(58) Field of Classification Search
USPC ........................................................ 343/700
See application file for complete search history.

(56) References Cited

U.S. PATENT DOCUMENTS 10,768,275 B2 * 9/2020 Kawaguchi ............ H01Q 21/06
11,735,879 B2 * 8/2023 Holloway .............. H01R 12/55
439/79

(Continued)

FOREIGN PATENT DOCUMENTS

JP 2002-510886 A 4/2002
JP 2020-028078 A 2/2020

(Continued)

*Primary Examiner* — Dimary S Lopez Cruz
*Assistant Examiner* — Brandon Sean Woods
(74) *Attorney, Agent, or Firm* — XSENSUS LLP

(57) ABSTRACT

A planar antenna includes a dielectric substrate, a feed line on a first surface of the dielectric substrate that has a first and second lateral sides, three rectangular-shaped radiation elements arrayed on the first surface and provided at the first and second lateral sides to alternately protrude, and an electromagnetic band gap structure having an arrangement region on the first surface. The first surface includes a first adjacent region adjacent to the first lateral side and a second adjacent region adjacent to the second lateral side. The arrangement region includes a first arrangement region in the first adjacent region and a second arrangement region in the second adjacent region. Part of the first arrangement region is closer to the feed line with respect to a first imaginary line, and part of the second arrangement region is closer to the feed line with respect to a second imaginary line.

17 Claims, 11 Drawing Sheets

(56) References Cited

U.S. PATENT DOCUMENTS

| | | | | |
|---|---|---|---|---|
| 12,294,151 | B2 * | 5/2025 | Petersson | H01Q 21/005 |
| 2010/0149060 | A1 * | 6/2010 | Lin | H01Q 9/0407<br>343/837 |
| 2015/0325923 | A1 * | 11/2015 | Hiramatsu | H01Q 9/16<br>343/815 |
| 2019/0051977 | A1 | 2/2019 | Kawaguchi et al. | |
| 2020/0058995 | A1 * | 2/2020 | Tsuchiya | H01Q 21/065 |

FOREIGN PATENT DOCUMENTS

| | | | |
|---|---|---|---|
| WO | 99/50929 | A1 | 10/1999 |
| WO | 2017/146164 | A1 | 8/2017 |

* cited by examiner

PLANAR ANTENNA

CROSS-REFERENCE TO RELATED APPLICATIONS

The present application is a national stage application, pursuant to 35 U.S.C. § 371, of International Patent Application No. PCT/JP2022/035468, filed Sep. 22, 2022, which claims priority from Japanese Patent Application No. 2022-004158, filed Jan. 14, 2022, the entire contents of each are incorporated herein by reference.

TECHNICAL FIELD

The present disclosure relates to a planar antenna.

BACKGROUND ART

In a planar antenna provided on a surface of a dielectric substrate, a surface current that is propagated on the substrate surface due to a radio wave radiated from the planar antenna may occur. This surface current is propagated from the planar antenna to the edge of the dielectric substrate, to cause a radiant wave from the edge. This radiant wave causes deterioration of the directivity of the planar antenna.

PATENT LITERATURE 1 discloses a technology that suppresses the surface current on the substrate surface by using an electromagnetic band gap structure.

CITATION LIST

Patent Literature

PATENT LITERATURE 1: Japanese Laid-open Patent Publication No. 2002-510886 (translation of PCT International Application)

SUMMARY OF THE INVENTION

A planar antenna as an embodiment includes: a dielectric substrate; a feed line provided on a first surface of the dielectric substrate and having a first lateral side extending along a first direction and a second lateral side opposed to the first lateral side; three or more radiation elements arrayed on the first surface along the first direction and provided at the first lateral side and the second lateral side so as to alternately protrude; and an electromagnetic band gap structure having an arrangement region on the first surface. The first surface includes a first adjacent region adjacent to the first lateral side and a second adjacent region adjacent to the second lateral side. The arrangement region includes a first arrangement region included in the first adjacent region, and a second arrangement region included in the second adjacent region. The three or more radiation elements include a plurality of first radiation elements protruding from the first lateral side toward the first adjacent region, and one or a plurality of second radiation elements protruding from the second lateral side toward the second adjacent region. At least a part of the first arrangement region is positioned closer to the feed line with respect to a first imaginary line below. At least a part of the second arrangement region is positioned closer to the feed line with respect to a second imaginary line below.

The first imaginary line: a straight line parallel to the first direction and passing through the first adjacent region, an interval between the straight line and an imaginary center line below being twice w1 below.

The second imaginary line: a straight line parallel to the first direction and passing through the second adjacent region, an interval between the straight line and the imaginary center line being twice w2 below.

The imaginary center line: a straight line parallel to the first direction and passing through a center, in a second direction orthogonal to the first direction, of the feed line.

The w1: an interval between the imaginary center line and a leading edge of the plurality of first radiation elements.

The w2: an interval between the imaginary center line and a leading edge of the one or the plurality of second radiation elements.

DETAILED DESCRIPTION

Figure 1:
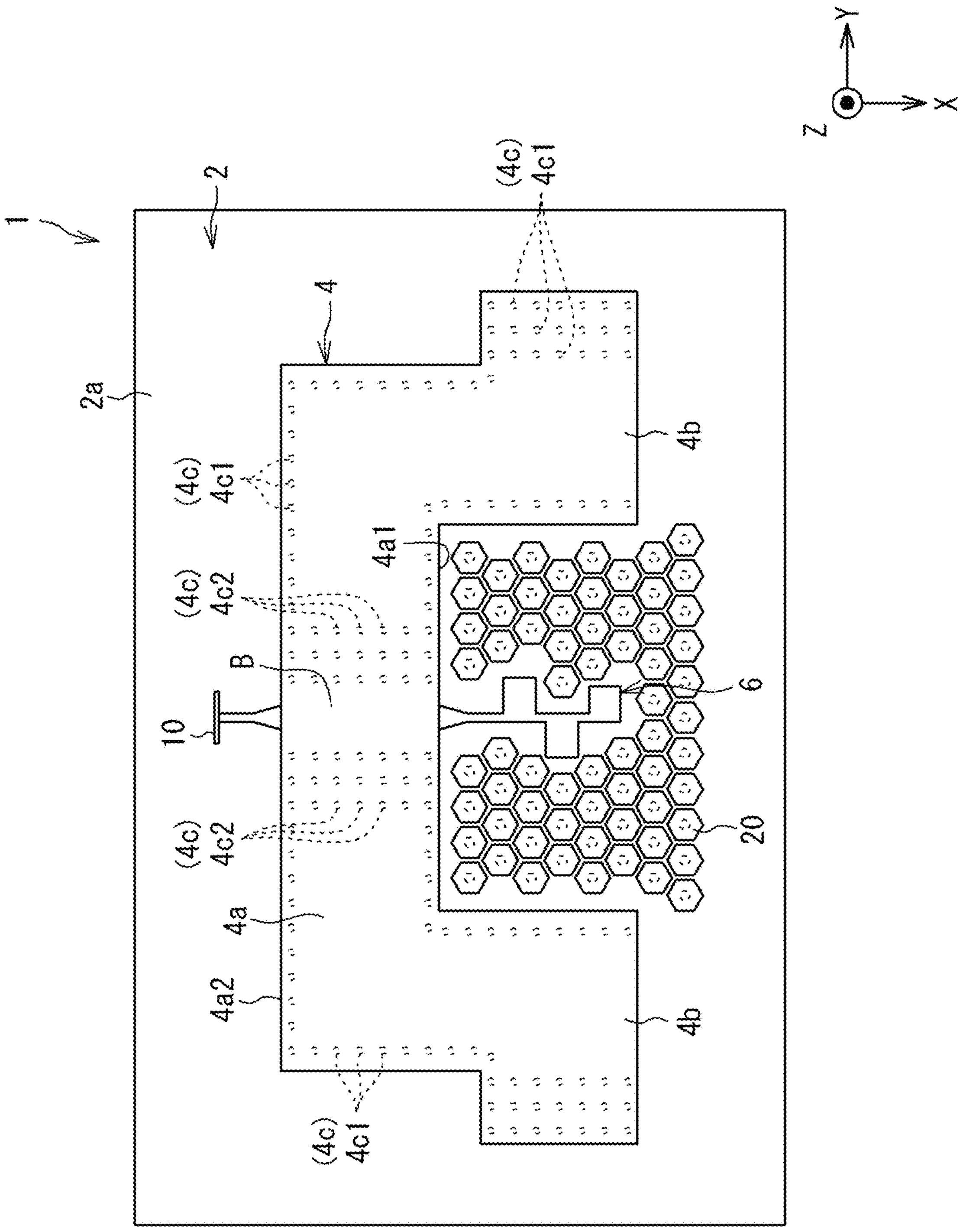
FIG. 1 is a plan view showing an example of a planar antenna according to a first embodiment.

Problems to be Solved by the Present Disclosure

The above conventional example indicates that influence of the surface current can be suppressed by the electromagnetic band gap structure, but does not mention influence of the positional relationship between the antenna and the electromagnetic band gap structure on the directivity of the antenna and the surface current.

The inventors of the present application conducted a thorough study with respect to the influence of the positional relationship between an antenna and an electromagnetic band gap structure on the directivity of the antenna.

In the study, the inventors found that the positional relationship between an antenna and an electromagnetic band gap structure has a large influence on a ripple appearing as an aspect of deterioration in the directivity of the antenna, and arrived at the present disclosure.

That is, an object of the present disclosure is to provide a technology that can effectively suppress the ripple appearing in the directivity of an antenna.

Effects of the Present Disclosure

According to the present disclosure, the ripple appearing in the directivity of an antenna can be effectively suppressed.

DESCRIPTION OF EMBODIMENTS OF THE PRESENT DISCLOSURE

First, contents of the embodiments will be listed and described.

(1) A planar antenna as an embodiment includes: a dielectric substrate; a feed line provided on a first surface of the dielectric substrate and having a first lateral side extending along a first direction and a second lateral side opposed to the first lateral side; three or more radiation elements arrayed on the first surface along the first direction and provided at the first lateral side and the second lateral side so as to alternately protrude; and an electromagnetic band gap structure having an arrangement region on the first surface. The first surface includes a first adjacent region adjacent to the first lateral side and a second adjacent region adjacent to the second lateral side. The arrangement region includes a first arrangement region included in the first adjacent region, and a second arrangement region included in the second adjacent region. The three or more radiation elements include a plurality of first radiation elements protruding from the first lateral side toward the first adjacent region, and one or a plurality of second radiation elements protruding from the second lateral side toward the second adjacent region. At least a part of the first arrangement region is positioned closer to the feed line with respect to a first imaginary line below. At least a part of the second arrangement region is positioned closer to the feed line with respect to a second imaginary line below.

The first imaginary line: a straight line parallel to the first direction and passing through the first adjacent region, an interval between the straight line and an imaginary center line below being twice w1 below.

The second imaginary line: a straight line parallel to the first direction and passing through the second adjacent region, an interval between the straight line and the imaginary center line being twice w2 below.

The imaginary center line: a straight line parallel to the first direction and passing through a center, in a second direction orthogonal to the first direction, of the feed line.

The w1: an interval between the imaginary center line and a leading edge of the plurality of first radiation elements.

The w2: an interval between the imaginary center line and a leading edge of the one or the plurality of second radiation elements.

According to the above configuration, at least a part of the electromagnetic band gap structure can be provided closer to the feed line with respect to the first imaginary line and the second imaginary line. Therefore, the electromagnetic band gap structure and the plurality of radiation elements can be made moderately close to each other.

As a result, the ripple appearing in the directivity of the antenna can be effectively suppressed.

(2) In the planar antenna (1) above, preferably, at least a part of the first arrangement region is positioned closer to the feed line with respect to a third imaginary line below, and at least a part of the second arrangement region is positioned closer to the feed line with respect to a fourth imaginary line below.

The third imaginary line: a straight line parallel to the first direction and passing through a leading edge of the plurality of first radiation elements.

The fourth imaginary line: a straight line parallel to the first direction and passing through a leading edge of the one or the plurality of second radiation elements.

In this case, the electromagnetic band gap structure and the plurality of radiation elements can be made closer to each other.

As a result, the ripple appearing in the directivity of the antenna can be further effectively suppressed.

(3) In the planar antenna of (2) above, preferably, a part of the first arrangement region is positioned between the plurality of first radiation elements.

In this case, the electromagnetic band gap structure and the plurality of first radiation elements can be made closer to each other.

(4) In the planar antenna of (2) or (3) above, a maximum value of a width dimension along the second direction of the first arrangement region may be larger than a maximum value of a width dimension along the second direction of the plurality of first radiation elements, and a maximum value of a width dimension along the second direction of the second arrangement region may be larger than a maximum value of a width dimension along the second direction of the one or the plurality of second radiation elements.

In this case, the surface current occurring from the side of the lateral side of the feed line can be effectively suppressed from being propagated to the periphery.

(5) In the planar antenna of any one of (1) to (4) above, the arrangement region may further include a third arrangement region connecting the first arrangement region and the second arrangement region so as to surround the feed line.

In this case, the surface current occurring from the leading end side of the feed line can be suppressed from being propagated to the periphery.

(6) In the planar antenna of any one of (2) to (4) above, a part of the second arrangement region may be positioned between the plurality of second radiation elements.

In this case, the electromagnetic band gap structure and the plurality of second radiation elements can be made closer to each other.

(7) In the planar antenna of any one of (2) to (4) and (6) above, the third imaginary line may be a straight line parallel to the first direction and passing through a leading edge farthest from the imaginary center line out of leading edges of the plurality of first radiation elements.

In this case, the area of the region between the first lateral side and the third imaginary line can be ensured to be as large as possible. As a result, setting the first arrangement region 31 so as to be closer to the feed line with respect to the third imaginary line I3 can be facilitated.

(8) In the planar antenna of any one of (2) to (4), (6), and (7) above, the fourth imaginary line may be a straight line parallel to the first direction and passing through a leading edge farthest from the imaginary center line out of leading edges of the plurality of second radiation elements.

In this case, the area of the region between the second lateral side and the fourth imaginary line can be ensured to be as large as possible. As a result, setting the second arrangement region so as to be closer to the feed line with respect to the fourth imaginary line can be facilitated.

(9) In the planar antenna of any one of (1) to (8) above, the w1 may be an interval between the imaginary center line and a leading edge farthest from the imaginary center line out of leading edges of the plurality of first radiation elements.

In this case, the area of the region between the first lateral side and the first imaginary line can be ensured to be as large as possible. As a result, setting the first arrangement region so as to be closer to the feed line 12 with respect to the first imaginary line can be facilitated.

(10) In the planar antenna of any one of (1) to (9) above, the w2 may be an interval between the imaginary center line and a leading edge farthest from the imaginary center line out of leading edges of the plurality of second radiation elements.

In this case, the area of the region between the second lateral side and the second imaginary line can be ensured to be as large as possible. As a result, setting the second arrangement region so as to be closer to the feed line with respect to the second imaginary line can be facilitated.

(11) In the planar antenna of any one of (1) to (10) above, preferably, each radiation element has a rectangular shape.

In this case, the radiation element can be easily made close to the electromagnetic band gap structure.

DETAILS OF EMBODIMENTS

Hereinafter, preferable embodiments will be described with reference to the drawings.

At least some parts of the embodiments described below may be combined as desired.

First Embodiment

Figure 2:
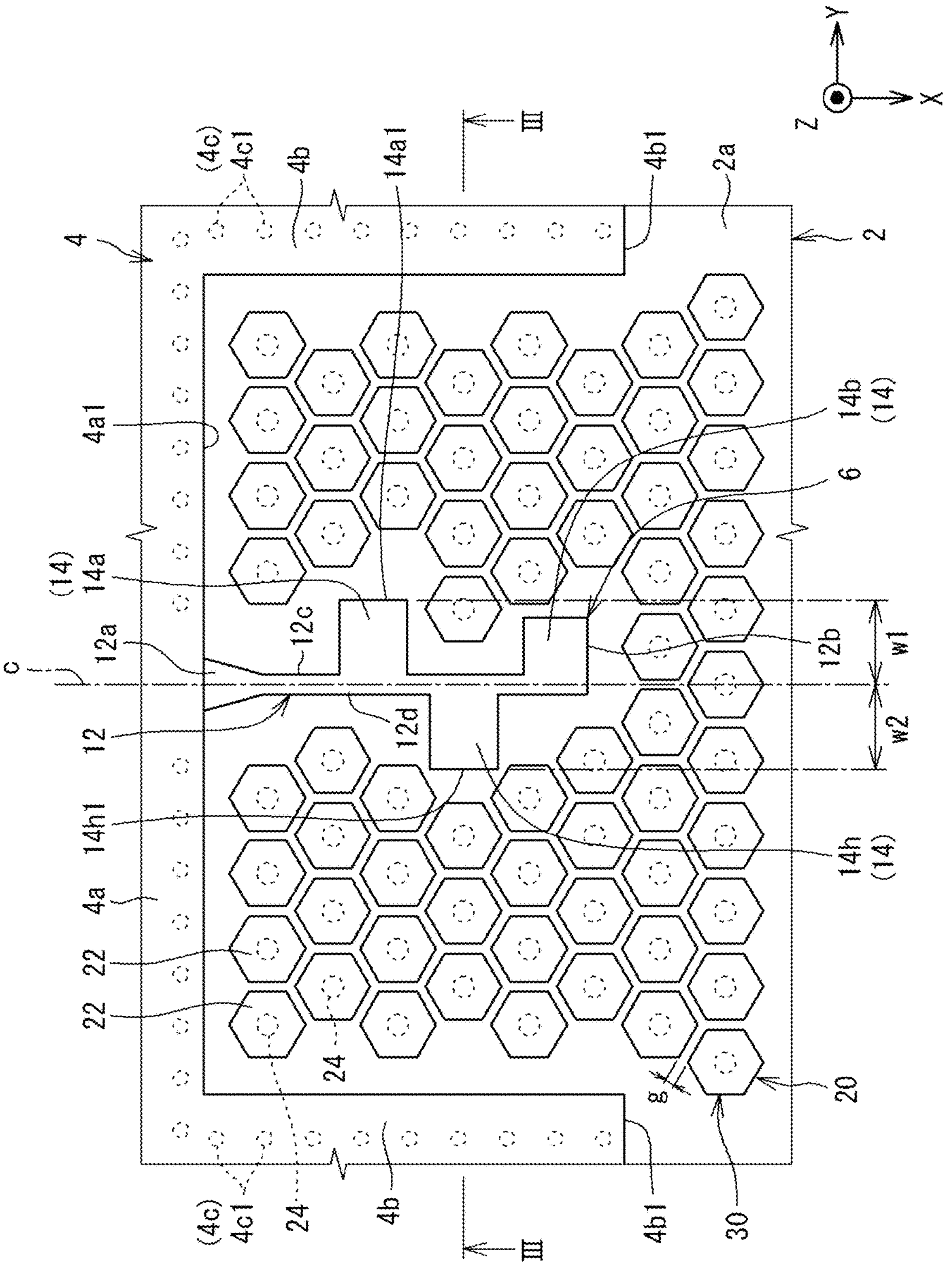
FIG. 2 is an enlarged view of a main part of FIG. 1.

FIG. 1 is a plan view showing an example of a planar antenna according to a first embodiment, and FIG. 2 is an enlarged view of a main part of FIG. 1.

This planar antenna 1 is, for example, a planar antenna that is mounted to a traffic infrastructure or the like and that is used in transmission of a radio wave (radar wave) in a radar for detecting vehicles and pedestrians.

In the description below, in each drawing, three directions orthogonal to each other are defined as an X-direction (first direction), a Y-direction (second direction), and a Z-direction. In the X-direction, the direction in which an arrow X is oriented will be referred to as an X1-direction, the direction in which an arrow Y is oriented will be referred to as a Y1-direction, and the direction in which an arrow Z is oriented will be referred to as a Z1-direction. The opposite direction of the arrow X will be referred to as an X2-direction, the opposite direction of the arrow Y will be referred to as a Y2-direction, and the opposite direction of the arrow Z will be referred to as a Z2-direction.

The planar antenna 1 includes: a dielectric substrate 2 having a rectangular shape; a first ground plate 4 provided on a first surface 2*a* of the dielectric substrate 2; an array antenna 6 provided on the first surface 2*a*; and a second ground plate 8 provided on a second surface 2*b* of the dielectric substrate 2. The second surface 2*b* of the dielectric substrate 2 is the opposite surface of the first surface 2*a*. The second ground plate 8 is a plate-shaped member composed of a conductor such as copper. The second ground plate 8 is provided over approximately the entire region of the second surface 2*b*.

The planar antenna 1 is formed by using a rigid substrate or a flexible substrate. Examples of the material of the dielectric substrate 2 include polyimide, liquid crystal polymer, PPE resin, and fluorocarbon resin.

The first ground plate 4 is a plate-shaped member composed of a conductor such as copper. The first ground plate 4 includes a base part 4*a* having a rectangular shape and extending along the Y-direction, and a pair of L-shaped parts 4*b* extending from both ends in the longitudinal direction of the base part 4*a* into the X1-direction.

At the center in the Y-direction at one lateral side 4*a*1 of the base part 4*a*, the array antenna 6 is connected.

At the center in the Y-direction at the other lateral side 4*a*2 of the base part 4*a*, a feeding point 10 is provided. A signal wave radiated by the array antenna 6 is provided to the feeding point 10.

The first ground plate 4 is connected to the second ground plate 8 through a plurality of vias 4*c*. The plurality of vias 4*c* are each a columnar member composed of a conductor such as copper. The plurality of vias 4*c* penetrate the portion between the first surface 2*a* and the second surface 2*b* of the dielectric substrate 2. The plurality of vias 4*c* may be provided as through-holes.

The plurality of vias 4*c* include a plurality of outer peripheral vias 4*c*1 provided along the peripheral edge of the first ground plate 4, and a plurality of inner vias 4*c*2 provided in a center portion of the base part 4*a*.

The plurality of inner vias 4*c*2 are provided so as to cross the base part 4*a* along the X-direction, on both sides of a band-shaped region B where no vias are provided in a center portion in the Y-direction of the base part 4*a*.

Both sides in the Y-direction of the band-shaped region B are sectioned by the plurality of inner vias 4*c*2. The feeding point 10 is connected to the end, facing the X2-direction, of the band-shaped region B. The array antenna 6 is connected to the end, facing the X1-direction, of the band-shaped region B.

The plurality of inner vias 4*c*2 and the band-shaped region B form a so-called substrate integrated waveguide (SIW). Therefore, a signal wave provided to the feeding point 10 passes through the band-shaped region B, to be provided to the array antenna 6.

The array antenna 6 is composed of a conductor such as copper provided on the first surface 2*a*.

As shown in FIG. 2, the array antenna 6 includes: a feed line 12 extending along the X-direction; and a plurality of radiation elements 14 arrayed at a predetermined interval along the X-direction.

A base end 12*a*, which is one end of the feed line 12, is connected to the base part 4*a*. A leading end 12*b*, which is the other end of the feed line 12, is positioned closer to the base part 4*a* than an edge 4*b*1 of each L-shaped part 4*b*.

The feed line 12 has a first lateral side 12*c* extending along the X-direction, and a second lateral side 12*d* opposed to the first lateral side 12*c*. The first lateral side 12*c* faces the Y1-direction. The second lateral side 12*d* faces the Y2-direction.

The plurality of radiation elements 14 each have a rectangular shape. The plurality of radiation elements 14 are provided at the first lateral side 12*c* and the second lateral side 12*d* of the feed line 12 so as to alternately protrude.

The plurality of radiation elements 14 are connected integrally with the feed line 12. Therefore, the signal wave provided to the array antenna 6 is provided to the plurality of radiation elements 14 through the feed line 12.

The plurality of radiation elements 14 radiate the provided signal wave, as a radio wave, into the air.

The array antenna 6 of the present embodiment includes three radiation elements 14. Out of the three radiation elements 14, radiation elements 14*a*, 14*b* protruding from the first lateral side 12*c* into the Y1-direction are also referred to as first radiation elements 14*a*, 14*b*, and a radiation element 14*h* protruding from the second lateral side 12*d* into the Y2-direction is also referred to as a second radiation element 14*h*. The first radiation element 14*b* is provided at the leading end 12*b* of the feed line 12.

When the set wavelength is defined as λ, the pitch in the X-direction of the plurality of radiation elements 14 is set to λ/2. The set wavelength λ is a wavelength set based on the wavelength when the signal wave transmitted by the array antenna 6 is propagated through the feed line.

The pitch is the interval between the centers in the X-direction of the radiation elements 14 adjacent to each other in the X-direction.

Therefore, the interval between the center in the X-direction of the first radiation element 14*a* and the center in the X-direction of the first radiation element 14*b* is λ.

An interval w1 between an imaginary center line C of the feed line 12 and a leading edge 14*a*1 of the first radiation element 14*a* facing the Y1-direction is set to λ/2. The imaginary center line C is a straight line parallel to the X-direction and passing through the center in the Y-direction of the feed line 12.

An interval w2 between the imaginary center line C and a leading edge 14*h*1 of the second radiation element 14*h* facing the Y2-direction is also set to λ/2.

The dimension in the X-direction and the dimension in the Y-direction of the first radiation element 14*b* are slightly smaller than the dimension in the X-direction and the dimension in the Y-direction of the first radiation element 14*a* in consideration of a reflected wave when the signal wave is reflected at the leading end 12*b* of the feed line 12.

Therefore, in the present embodiment, w1 is the interval between the imaginary center line C and the leading edge farthest from the imaginary center line C out of the leading edges of the plurality of first radiation elements 14*a*, 14*b*.

The planar antenna 1 of the present embodiment further includes an electromagnetic band gap structure 20.

As shown in FIG. 2, the electromagnetic band gap structure 20 (hereinafter, also referred to as an EBG structure 20) is provided so as to surround the periphery of the array antenna 6. The EBG structure 20 has an arrangement region 30 on the first surface 2*a*. The arrangement region 30 is a region where the EBG structure 20 is provided.

The EBG structure 20 includes a plurality of unit cells 22 and a plurality of vias 24.

The plurality of unit cells 22 are provided on the first surface 2*a* of the dielectric substrate 2. The plurality of unit cells 22 are each a plate-shaped member composed of a conductor such as copper. The outer shape of each unit cell 22 is a regular hexagon in an X-Y plane.

As shown in FIG. 2, the plurality of unit cells 22 are regularly arrayed on the first surface 2*a*. The plurality of unit cells 22 are arrayed with a gap g therebetween. The gap g is preferably uniform.

The outer shape of the unit cell 22 is preferably a regular hexagon, but may be a square or may be another polygon. When the outer shape of the unit cell 22 is a regular hexagon, the unit cells 22 can be arrayed at a higher density than in the case of a square. Further, the outer shape of the unit cell 22 may include a curve portion or uneven shapes.

Figure 3:
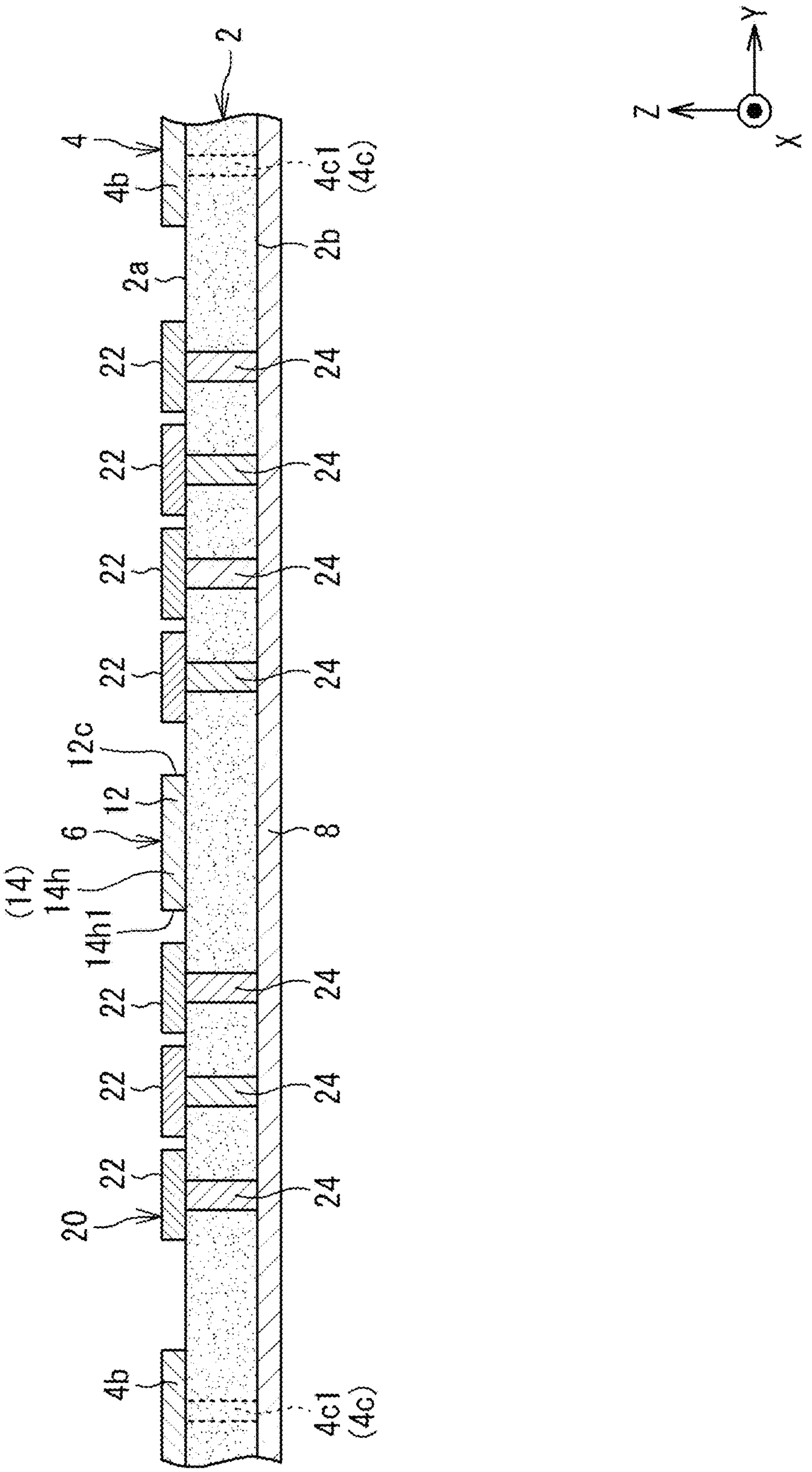
FIG. 3 is a cross-sectional view taken along arrows III-III in FIG. 2.

FIG. 3 is a cross-sectional view taken along arrows III-III in FIG. 2.

The plurality of vias 24 are each a columnar member composed of a conductor such as copper. Each of the plurality of vias 24 connects a unit cell 22 and the second ground plate 8. Thus, the via 24 penetrates the portion between the first surface 2*a* and the second surface 2*b* of the dielectric substrate 2. The via 24 may be provided as a through-hole.

The EBG structure 20 is a type of an EBG structure having a mushroom structure. The EBG structure 20 has a characteristic of shielding a radio wave in a certain frequency band. That is, the EBG structure has a frequency band (shielding band) in which a radio wave can be shielded.

The shielding band of the EBG structure 20 of the present embodiment is set so as to include the frequency of the radio wave radiated from the array antenna 6.

Figure 4:
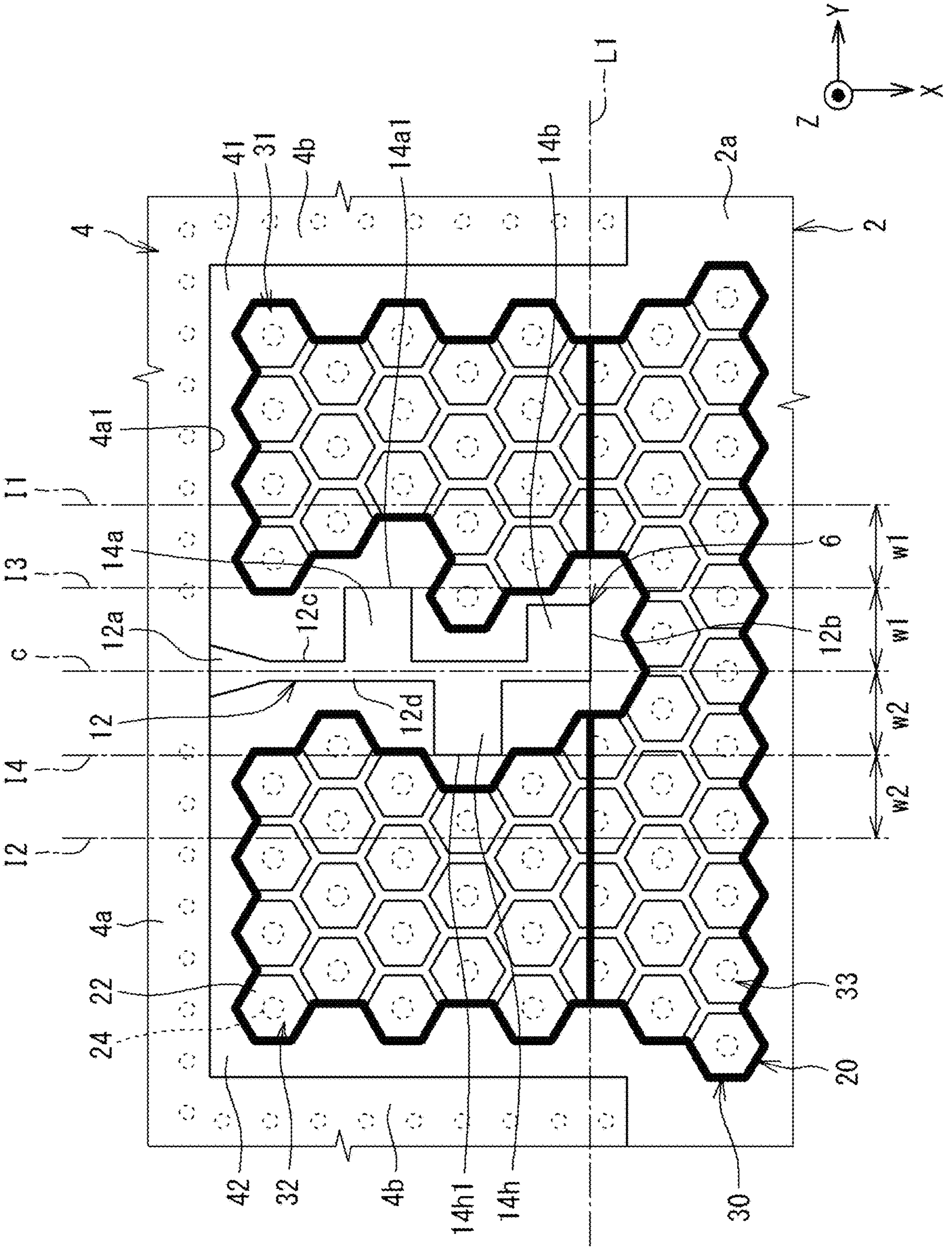
FIG. 4 is a diagram for describing an arrangement region of an EBG structure.

FIG. 4 is a diagram for describing the arrangement region 30 of the EBG structure 20.

The arrangement region 30 of the EBG structure 20 of the present embodiment includes a first arrangement region 31, a second arrangement region 32, and a third arrangement region 33.

The first arrangement region 31 is a region, in the range in the X-direction from the base end 12*a* to the leading end 12*b* of the feed line 12, that is arranged so as to be adjacent, with an interval, to the first lateral side 12*c* of the feed line 12.

Here, the range in the X-direction from the base end 12*a* to the leading end 12*b* is a range, on the first surface 2*a*, sandwiched by a straight line (a straight line matching the one lateral side 4*a*1 of the first ground plate 4) passing through the base end 12*a* and a straight line L1 passing through the leading end 12*b* of the feed line 12.

The outer edge on the X1-direction side of the first arrangement region 31 extends along the straight line L1. Therefore, the first arrangement region 31 is included in a first adjacent region 41. The first adjacent region 41 is a region surrounded by the straight line L1, the first lateral side 12*c* of the feed line 12, the base part 4*a*, and the L-shaped part 4*b* connected to the end in the Y1-direction of the base part 4*a*. That is, the first adjacent region 41 is a region adjacent to the first lateral side 12*c*.

The second arrangement region 32 is a region, in the range in the X-direction from the base end 12*a* to the leading end 12*b*, that is arranged so as to be adjacent, with an interval, to the second lateral side 12*d* of the feed line 12. Similar to the first arrangement region 31, the outer edge on the X1-direction side of the second arrangement region 32 also extends along the straight line L1. Therefore, the second arrangement region 32 is included in a second adjacent region 42. The second adjacent region 42 is a region surrounded by the straight line L1, the second lateral side 12*d* of the feed line 12, the base part 4*a*, and the L-shaped part 4*b* connected to the end in the Y2-direction of the base part 4*a*. That is, the second adjacent region 42 is a region adjacent to the second lateral side 12*d*.

The first adjacent region 41 and the second adjacent region 42 are included in the first surface 2*a*.

The first adjacent region 41 is adjacent to the first lateral side 12*c*. Therefore, the first radiation elements 14*a*, 14*b* protrude from the first lateral side 12*c* toward the first adjacent region 41.

The second adjacent region 42 is adjacent to the second lateral side 12*d*. Therefore, the second radiation element 14*h* protrudes from the second lateral side 12*d* toward the second adjacent region 42.

The third arrangement region 33 is a region adjacent in the X1-direction to the first adjacent region 41 and the second adjacent region 42. The third arrangement region 33 and the first arrangement region 31 are connected to each other with the straight line L1 as a boundary. The third arrangement region 33 and the second arrangement region 32 are connected to each other with the straight line L1 as a boundary.

Therefore, the third arrangement region 33 connects the first arrangement region 31 and the second arrangement region 32. Accordingly, in the array antenna 6, the region in the X1-direction of the array antenna 6, the region in the Y1-direction of the array antenna 6, and the region in the Y2-direction of the array antenna 6 are surrounded by the EBG structure 20.

The outer edge other than the portion of the straight line L1 of each arrangement region 31, 32, 33 is determined by the outer edges of unit cells 22 positioned at the outer edge of the arrangement region 31, 32, 33, out of the plurality of unit cells 22 forming the arrangement region 31, 32, 33.

In FIG. 4, a first imaginary line I1 is a straight line parallel to the X-direction and positioned between the first lateral side 12*c* of the feed line 12 and the L-shaped part 4*b* connected to the end in the Y1-direction of the base part 4*a*. In other words, the first imaginary line I1 is a straight line passing through the first adjacent region 41.

A second imaginary line 12 is a straight line parallel to the X-direction and positioned between the second lateral side 12*d* of the feed line 12 and the L-shaped part 4*b* connected to the end in the Y2-direction of the base part 4*a*. In other words, the second imaginary line I2 is a straight line passing through the second adjacent region 42.

A third imaginary line I3 is a straight line parallel to the X-direction and passing through the leading edge 14*a*1 of the first radiation element 14*a*.

Therefore, in the present embodiment, the third imaginary line I3 is a straight line passing through the leading edge 14*a*1 farthest from the imaginary center line C out of the leading edges of the plurality of first radiation elements 14*a*, 14*b*.

A fourth imaginary line I4 is a straight line parallel to the X-direction and passing through the leading edge 14*h*1 of the second radiation element 14*h*.

The interval between the third imaginary line I3 and the imaginary center line C is w1 as described above. The interval between the fourth imaginary line I4 and the imaginary center line C is w2 as described above.

The interval between the first imaginary line I1 and the imaginary center line C is set to twice w1. Therefore, the interval between the first imaginary line I1 and the third imaginary line I3 is w1.

The interval between the second imaginary line I2 and the imaginary center line C is set to twice w2. Therefore, the interval between the second imaginary line I2 and the fourth imaginary line I4 is w2.

In the present embodiment, the first imaginary line I1 and the third imaginary line I3 cross the first arrangement region 31. Accordingly, a part of the first arrangement region 31 is positioned closer to the feed line 12 with respect to the third imaginary line I3.

As shown in FIG. 4, a part of the first arrangement region 31 is positioned between the first radiation element 14*a* and the first radiation element 14*b*.

Accordingly, the part of the first arrangement region 31 positioned between the first radiation elements 14*a*, 14*b* can be made closer to the first radiation elements 14*a*, 14*b* than the other part of the first arrangement region 31.

Similarly, the second arrangement region 32 is positioned over the second imaginary line I2 and the fourth imaginary line I4. Accordingly, a part of the second arrangement region 32 is positioned closer to the feed line 12 with respect to the fourth imaginary line I4.

Therefore, as shown in FIG. 4, a part of the second arrangement region 32 is closer to the second radiation element 14*h* than the other part of the second arrangement region 32.

Thus, in the present embodiment, the EBG structure 20 can be provided closer to the feed line 12 with respect to the first imaginary line I1 and the second imaginary line I2, and thus, the EBG structure 20 and the radiation elements 14*a*, 14*b*, 14*h* can be made close to each other.

As a result, the ripple appearing in the directivity of the array antenna 6 can be suppressed.

Further, in the present embodiment, a part of the first arrangement region 31 is positioned closer to the feed line 12 with respect to the third imaginary line I3, and a part of the second arrangement region 32 is positioned closer to the feed line 12 with respect to the fourth imaginary line I4. Therefore, the EBG structure 20 and the radiation elements 14*a*, 14*b*, 14*h* can be made closer to each other.

As a result, the ripple appearing in the directivity of the array antenna 6 can be more effectively suppressed.

In the present embodiment, the third arrangement region 33 connected to the first arrangement region 31 and the second arrangement region 32 on the leading end 12*b* side of the feed line 12 is provided. Therefore, the surface current occurring from the leading end 12*b* side of the feed line 12 can be suppressed from being propagated to the periphery.

In the present embodiment, the maximum value of the width dimension along the Y-direction of the first arrangement region 31 is larger than the maximum value of the width dimension along the Y-direction of the first radiation element 14*a*, 14*b* and the maximum value of the width dimension along the Y-direction of the second arrangement region 32 is larger than the maximum value of the width dimension along the Y-direction of the second radiation element 14*h*.

Accordingly, the surface current occurring from the first lateral side 12*c* side and the second lateral side 12*d* side of the feed line 12 can be effectively suppressed from being propagated to the periphery.

In the present embodiment, w1 is the interval between the imaginary center line C and the leading edge 14*a*1 farthest from the imaginary center line C out of the leading edges of the plurality of first radiation elements 14*a*, 14*b*.

Further, in the present embodiment, the third imaginary line I3 is the straight line passing through the leading edge 14*a*1 farthest from the imaginary center line C out of the leading edges of the plurality of first radiation elements 14*a*, 14*b*.

Accordingly, the first imaginary line I1 and the third imaginary line I3 can be separated from the imaginary center line C as much as possible, and the area of the region between: the first lateral side 12*c*; and the first imaginary line I1 and the third imaginary line I3 can be ensured to be large. As a result, setting the first arrangement region 31 so as to be closer to the feed line 12 with respect to the first imaginary line I1 and the third imaginary line I3 can be facilitated.

Here, a cause for the ripple appearing in the directivity of the array antenna 6 will be described.

Figure 5A:
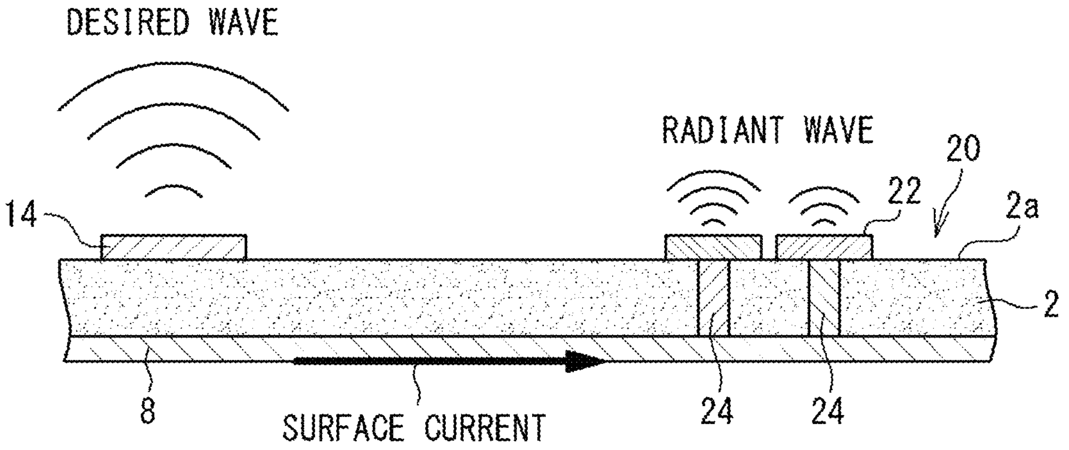
FIG. 5A is a cross-sectional view showing a radiation element and the EBG structure.

FIG. 5A is a cross-sectional view showing a radiation element 14 and the EBG structure 20.

As shown in FIG. 5A, when the radiation element 14 has radiated a radio wave, a surface current flows along the surface of the second ground plate 8. The surface current is blocked by the unit cells 22 and the vias 24 of the EBG structure 20. Here, a part of the energy of the blocked surface current is radiated from the unit cells 22. It is considered that the desired wave is strengthened or weakened by the radiant wave from the unit cells 22, whereby a ripple occurs in the directivity of the array antenna 6.

Figure 5B:
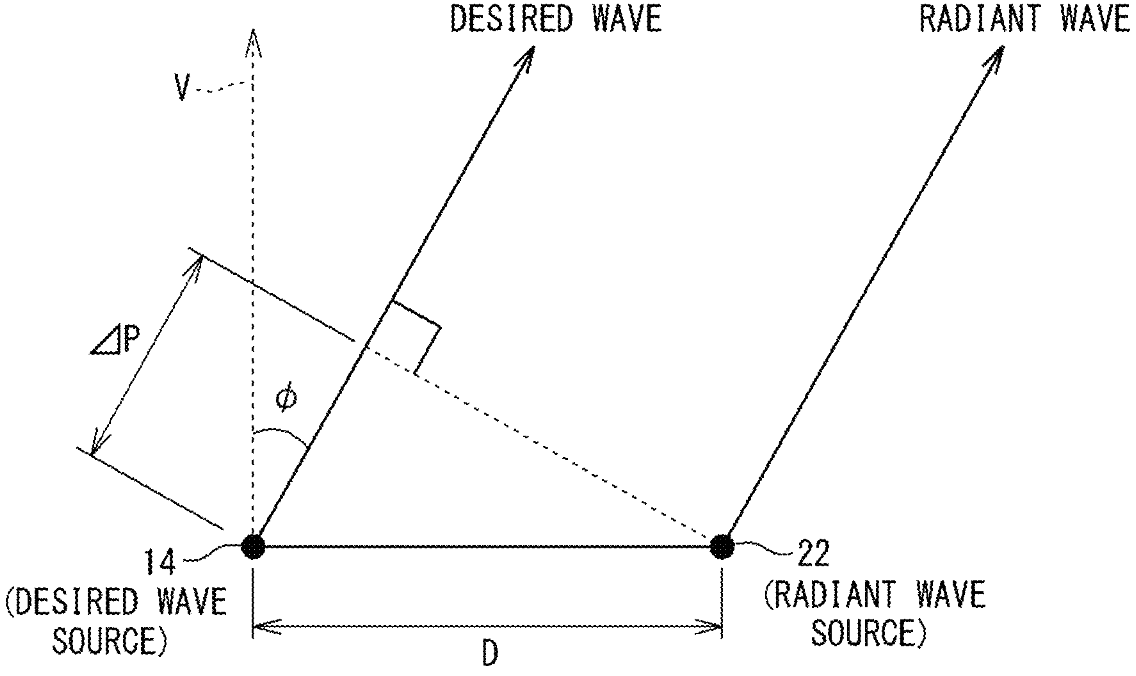
FIG. 5B shows a relationship between a desired wave from a radiation element and a radiant wave from a unit cell, of the EBG structure, positioned adjacent to the radiation element.

FIG. 5B shows a relationship between the desired wave from a radiation element 14 and the radiant wave from a unit cell 22, of the EBG structure 20, positioned adjacent to the radiation element 14.

The desired wave and the radiant wave are radiated to the periphery around their wave sources, but in FIG. 5B, out of the desired wave and the radiant wave, components of which the angle with respect to a perpendicular line V to the radiation surface of the radiation element 14 is Φ are indicated by arrows.

In FIG. 5B, the desired wave and the radiant wave have the same phase when formula (1) below is satisfied.

$$\Delta P = n\lambda a (n = 1, 2, 3 \ldots) \qquad (1)$$

λa is the wavelength in air of the desired wave.

When an interval D between the radiation element 14 as the desired wave source and the unit cell 22 as the radiant wave source shown in FIG. 5B is smaller, the period of the angle Φ satisfying the above (1) increases accordingly.

The directivity of the antenna is represented by change in the gain corresponding to the angle Φ. Therefore, when the period of the angle Φ satisfying the above (1) increases, the period of the gain variation appearing in the directivity of the antenna increases, whereby the ripple is suppressed.

That is, when the interval D between the radiation element 14 and the unit cell 22 is made smaller, the ripple appearing in the directivity of the antenna can be effectively suppressed accordingly.

Therefore, as in the present embodiment, when the EBG structure 20 and the radiation elements 14*a*, 14*b*, 14*h* are made closer to each other, the ripple appearing in the directivity of the array antenna 6 can be effectively suppressed.

First Modification of First Embodiment

Figure 6:
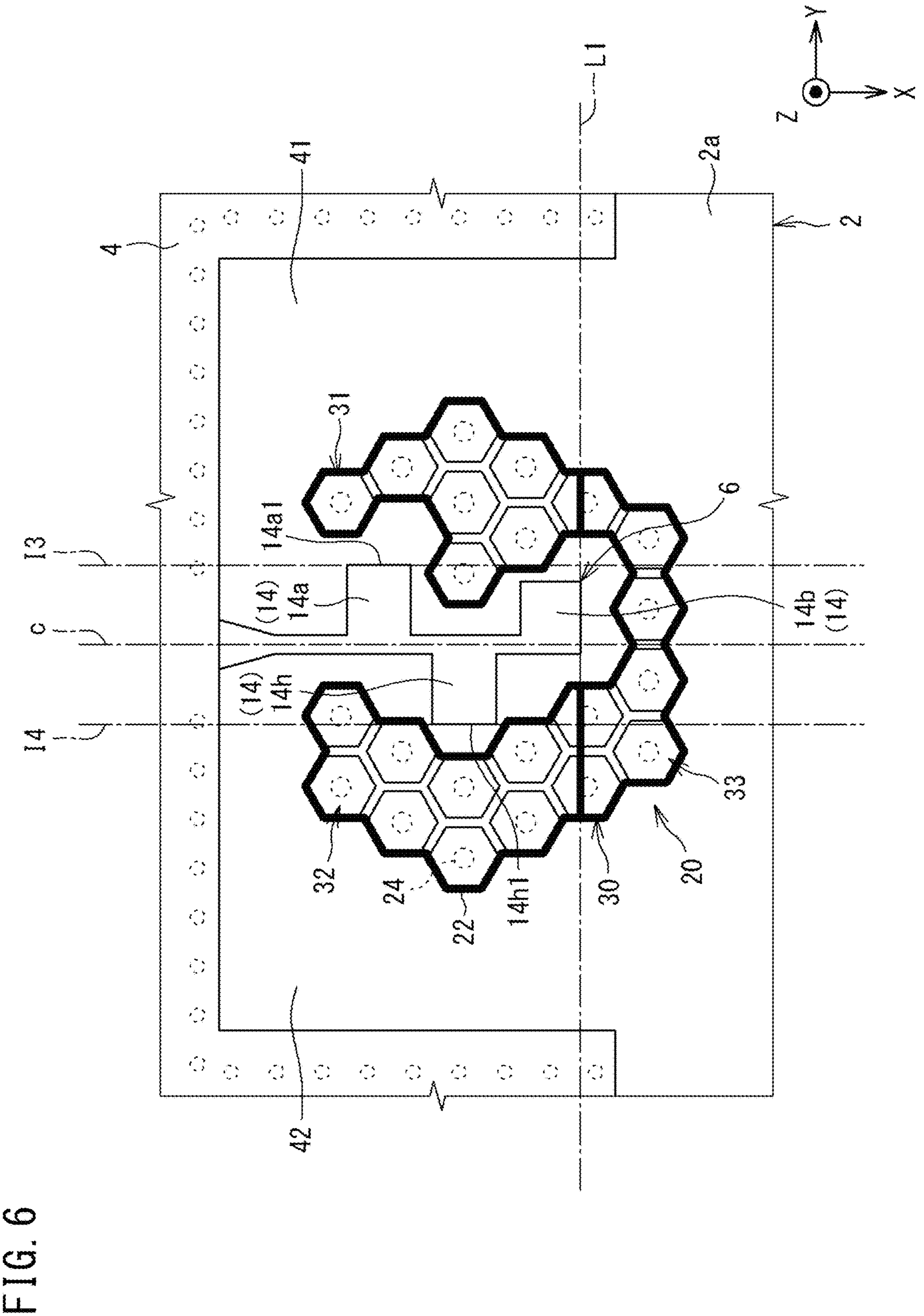
FIG. 6 shows an EBG structure according to a first modification of the first embodiment.

FIG. 6 shows the EBG structure 20 according to a first modification of the first embodiment.

In the present modification, the arrangement region 30 is set such that the unit cells 22 adjacent to the radiation element 14 remain and the unit cells 22 away from the radiation element 14 are removed.

Therefore, the first arrangement region 31, the second arrangement region 32, and the third arrangement region 33 of the present modification are smaller than those in the first embodiment.

The outer edge in the Y2-direction of the first arrangement region 31 and the outer edge in the Y1-direction of the second arrangement region 32 are the same as those in the first embodiment. A part of the first arrangement region 31 is positioned closer to the feed line 12 with respect to the third imaginary line I3, and a part of the second arrangement region 32 is positioned closer to the feed line 12 with respect to the fourth imaginary line I4.

Therefore, the EBG structure 20 and the radiation elements 14*a*, 14*b*, 14*h* are very close to each other.

Thus, in the present modification as well, as in the first embodiment, the ripple appearing in the directivity of the array antenna 6 can be effectively suppressed.

Second Modification of First Embodiment

Figure 7:
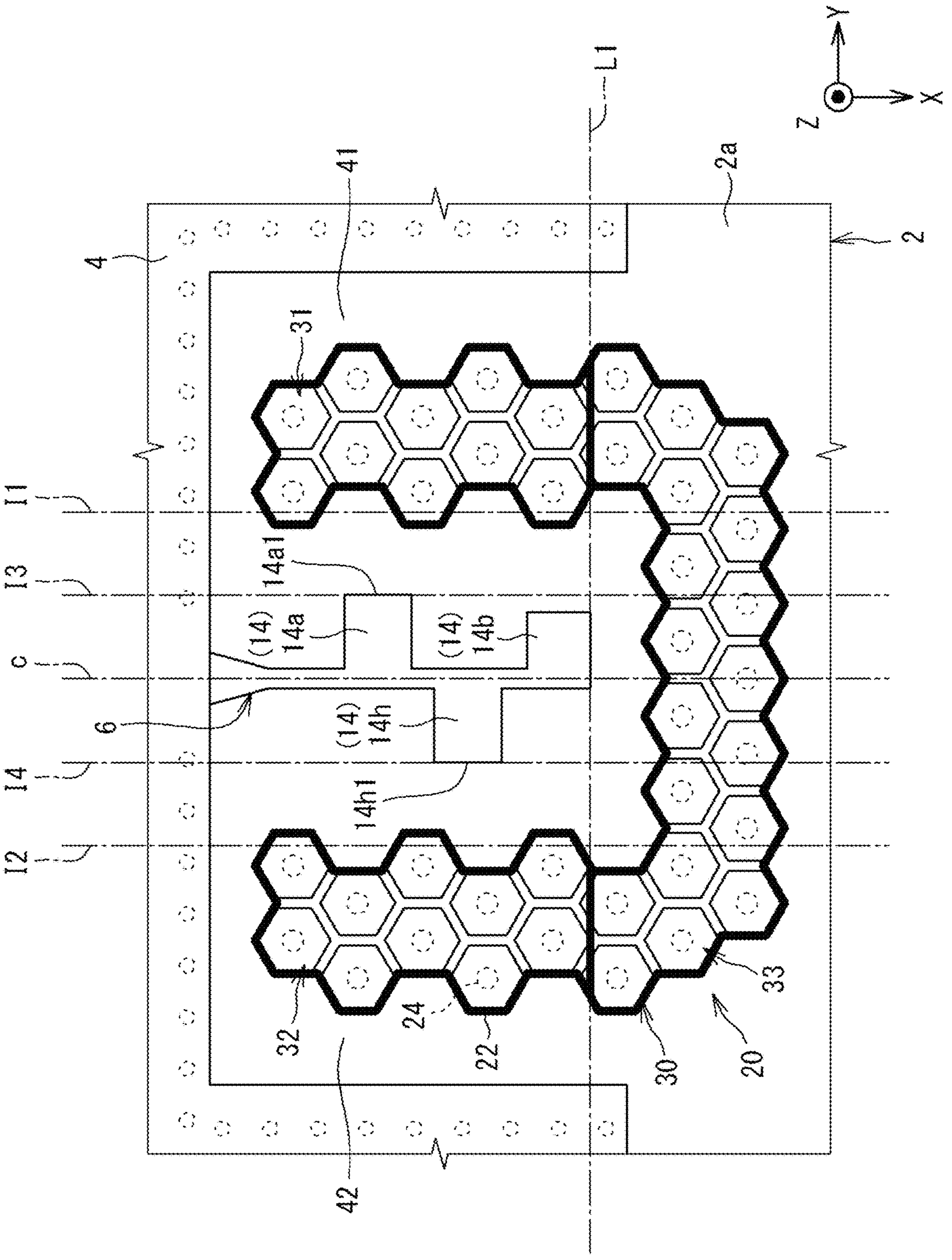
FIG. 7 shows an EBG structure according to a second modification of the first embodiment.

FIG. 7 shows the EBG structure 20 according to a second modification of the first embodiment.

In the present modification, the first arrangement region 31 is positioned over the first imaginary line I1, but is not positioned over the third imaginary line I3.

Similarly, the second arrangement region 32 is positioned over the second imaginary line I2, but is not positioned over the fourth imaginary line I4.

In the present modification, a part of the first arrangement region 31 is positioned closer to the feed line 12 with respect to the first imaginary line I1.

A part of the second arrangement region 32 is positioned closer to the feed line 12 with respect to the second imaginary line I2.

Accordingly, the EBG structure 20 and the radiation elements 14*a*, 14*b*, 14*h* can be made moderately close to each other.

As a result, in the present modification as well, the ripple appearing in the directivity of the array antenna 6 can be suppressed.

The EBG structure 20 and the radiation elements 14*a*, 14*b*, 14*h* can be made closer to each other in the first embodiment and the first modification than in the present modification. Therefore, the ripple appearing in the directivity of the array antenna 6 can be more effectively suppressed in the first embodiment and the first modification.

Second Embodiment

Figure 8:
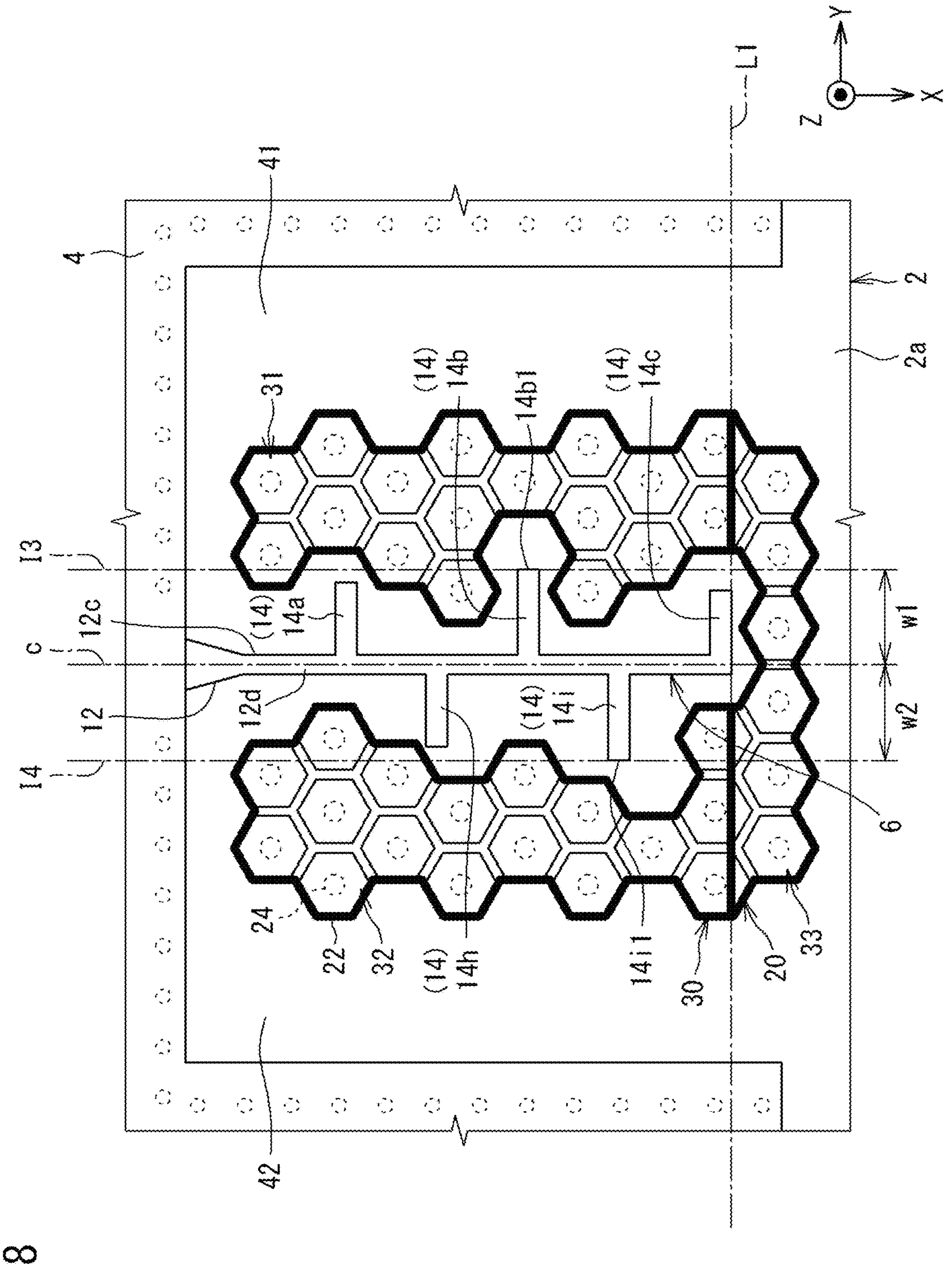
FIG. 8 shows an EBG structure according to a second embodiment.

FIG. 8 shows the EBG structure 20 according to a second embodiment.

The second embodiment is different from the first embodiment in that the array antenna 6 includes five radiation elements 14.

The width in the X-direction of each radiation element 14 of the present embodiment is smaller than the width of each radiation element 14 in the first embodiment.

The five radiation elements 14 are provided at the first lateral side 12*c* and the second lateral side 12*d* so as to alternately protrude, as in the first embodiment.

The five radiation elements 14 include first radiation elements 14*a*, 14*b*, 14*c* protruding from the first lateral side 12*c* into the Y1-direction, and second radiation elements 14*h*, 14*i* protruding from the second lateral side 12*d* into the Y2-direction.

Out of the first radiation elements 14*a*, 14*b*, 14*c*, the first radiation element 14*b* is longer in the Y-direction than the other first radiation elements.

The second radiation element 14*i* is longer in the Y-direction than the second radiation element 14*h*.

The interval w1 between the imaginary center line C of the feed line 12 and a leading edge 14*b*1 of the first radiation element 14*b* facing the Y1-direction is set to λ/2.

The interval w2 between the imaginary center line C and a leading edge 14*i*1 of the second radiation element 14*i* facing the Y2-direction is also set to λ/2.

The third imaginary line I3 of the present embodiment is a straight line parallel to the X-direction and passing through the leading edge 14*b*1 of the first radiation element 14*b*.

The fourth imaginary line I4 of the present embodiment is a straight line parallel to the X-direction and passing through the leading edge 14*i*1 of the second radiation element 14*i*.

Thus, the third imaginary line I3 and the fourth imaginary line I4 are each set based on a radiation element 14 having the longest length in the Y-direction out of the radiation elements 14.

That is, the third imaginary line I3 is a straight line passing through the leading edge 14*b*1 farthest from the imaginary center line C out of the leading edges of the plurality of first radiation elements 14*a*, 14*b*, 14*c*.

The fourth imaginary line I4 is a straight line passing through the leading edge 14*i*1 farthest from the imaginary center line C out of the leading edges of the plurality of second radiation elements 14*h*, 14*i*.

The first arrangement region 31 of the present embodiment is positioned over the third imaginary line I3. Accordingly, a part of the first arrangement region 31 is positioned closer to the feed line 12 with respect to the third imaginary line I3.

As shown in FIG. 8, a part of the first arrangement region 31 is positioned between the first radiation element 14*a* and the first radiation element 14*b* and between the first radiation element 14*b* and the first radiation element 14*c*.

Accordingly, the part of the first arrangement region 31 positioned between the first radiation elements 14*a*, 14*b* and the part of the first arrangement region 31 positioned between the first radiation elements 14*b*, 14*c* can be made closer to the first radiation elements 14*a*, 14*b*, 14*c* than the other part of the first arrangement region 31.

Similarly, the second arrangement region 32 is positioned over the fourth imaginary line I4. Accordingly, a part of the second arrangement region 32 is positioned closer to the feed line 12 with respect to the fourth imaginary line I4.

As shown in FIG. 8, a part of the second arrangement region 32 is positioned between the second radiation element 14*h* and the second radiation element 14*i*.

Accordingly, the part of the second arrangement region 32 positioned between the second radiation elements 14*h*, 14*i* can be made closer to the second radiation elements 14*h*, 14*i* than the other part of the second arrangement region 32.

Thus, in the present embodiment as well, a part of the first arrangement region 31 is positioned closer to the feed line 12 with respect to the third imaginary line I3, and a part of the second arrangement region 32 is positioned closer to the feed line 12 with respect to the fourth imaginary line I4. Therefore, the EBG structure 20 and the radiation elements 14 can be made closer to each other.

As a result, the ripple appearing in the directivity of the array antenna 6 can be effectively suppressed.

In the present embodiment, in all of the spaces between the plurality of first radiation elements 14*a*, 14*b*, 14*c*, a part of the first arrangement region 31 is provided, and a part of the second arrangement region 32 is provided between the plurality of second radiation elements 14*h*, 14*i*. Therefore, the arrangement region 30 can be provided along the contour of the array antenna 6, and thus, the ripple can be more appropriately suppressed.

As described above, the fourth imaginary line I4 is a straight line passing through the leading edge 14*i*1 farthest from the imaginary center line C out of the leading edges of the plurality of second radiation elements 14*h*, 14*i*.

Accordingly, the fourth imaginary line I4 and the imaginary center line C can be separated from each other as much as possible, and the area of the region between the second lateral side 12*d* and the fourth imaginary line I4 can be ensured to be large. As a result, setting the second arrangement region 32 so as to be closer to the feed line 12 with respect to the fourth imaginary line I4 can be facilitated.

Modification of Second Embodiment

Figure 9:
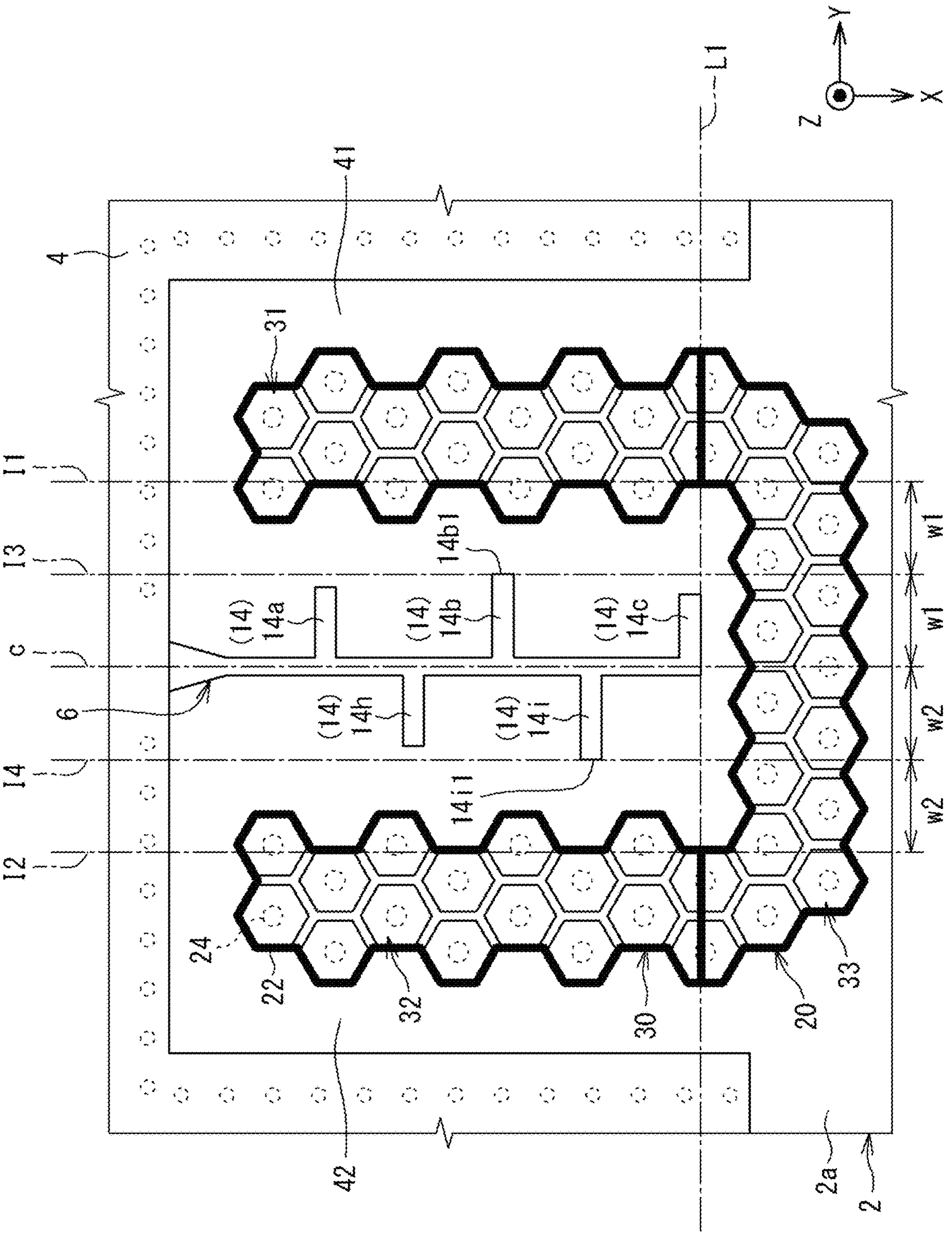
FIG. 9 shows an EBG structure according to a modification of the second embodiment.

FIG. 9 shows the EBG structure 20 according to a modification of the second embodiment.

In the present modification, the first arrangement region 31 is positioned over the first imaginary line I1, but is not positioned over the third imaginary line I3.

Similarly, the second arrangement region 32 is positioned over the second imaginary line I2, but is not positioned over the fourth imaginary line I4.

In the present modification, a part of the first arrangement region 31 is positioned closer to the feed line 12 with respect to the first imaginary line I1.

A part of the second arrangement region 32 is positioned closer to the feed line 12 with respect to the second imaginary line 12.

Accordingly, the EBG structure 20 and the radiation elements 14*a*, 14*b*, 14*c*, 14*h*, 14*i* can be made moderately close to each other.

As a result, in the present modification as well, the ripple appearing in the directivity of the array antenna 6 can be suppressed.

In the present modification, w2 is the interval between the imaginary center line C and the leading edge 14*i*1 farthest from the imaginary center line C out of the leading edges of the plurality of second radiation elements 14*h*, 14*i*.

Accordingly, the second imaginary line I2 and the imaginary center line C can be separated from each other as much as possible, and the area of the region between the second lateral side 12*d* and the second imaginary line I2 can be ensured to be large. As a result, setting the second arrangement region 32 so as to be closer to the feed line I2 with respect to the second imaginary line I2 can be facilitated.

Other Modifications

In each embodiment above, an example case where the arrangement region 30 includes the third arrangement region 33 has been shown. However, the arrangement region 30 may be configured not to include the third arrangement region 33. In this case as well, the ripple appearing in the directivity of the array antenna 6 can be suppressed by the first arrangement region 31 and the second arrangement region 32.

In each embodiment above, an example case where w1 (w2) is the interval between the imaginary center line C and the leading edge farthest from the imaginary center line C out of the leading edges of the plurality of first radiation elements (second radiation elements) has been shown. However, w1 (w2) may the interval between the imaginary center line C and a leading edge other than the leading edge farthest from the imaginary center line C out of the leading edges of the plurality of first radiation elements (second radiation elements).

In each embodiment above, an example case where the third imaginary line I3 (the fourth imaginary line I4) is a straight line passing through the leading edge farthest from the imaginary center line C out of the leading edges of the plurality of first radiation elements (second radiation elements) has been shown. However, the third imaginary line I3 (the fourth imaginary line I4) may be a straight line passing through a leading edge other than the leading edge farthest from the imaginary center line C out of the leading edges of the plurality of first radiation elements (second radiation elements).

In each embodiment above, an example of a planar antenna used in transmission of a radio wave has been shown. However, the planar antenna of the present embodiment can also be used as a planar antenna for reception.

In the present embodiment, only the array antenna 6 of one system has been shown and described. However, a plurality of the array antennas 6 surrounded by the EBG structure 20 may be arranged on the same dielectric substrate, to be used as array antennas of a plurality of systems.

In the above second embodiment and modifications thereof, an example case where the array antenna 6 includes five radiation elements 14 has been shown. However, the array antenna 6 may include seven or more radiation elements 14.

The planar antenna shown in the present embodiment can be used not only as an antenna for radar but also as a transmission and reception antenna for wireless communication.

[Verification Test]

Next, a verification test performed with respect to the effects of the arrangement of the EBG structure 20 will be described.

As the test method, a model of a planar antenna was constructed and using the model, the directivity pattern on a Y-Z plane (FIG. 1, etc.) was obtained through simulation by a computer.

Through comparison of the obtained directivity patterns, verification of the effects of the arrangement of the EBG structure 20 was performed.

For the verification test, models were constructed for three Examples and one Comparative Example below.

Example 1: the planar antenna 1 shown in the first embodiment.

Example 2: the planar antenna 1 shown in the first modification of the first embodiment.

Example 3: the planar antenna 1 shown in the second modification of the first embodiment.

Comparative Example: the planar antenna 1 shown in the first embodiment without the EBG structure 20.

Figure 10A:
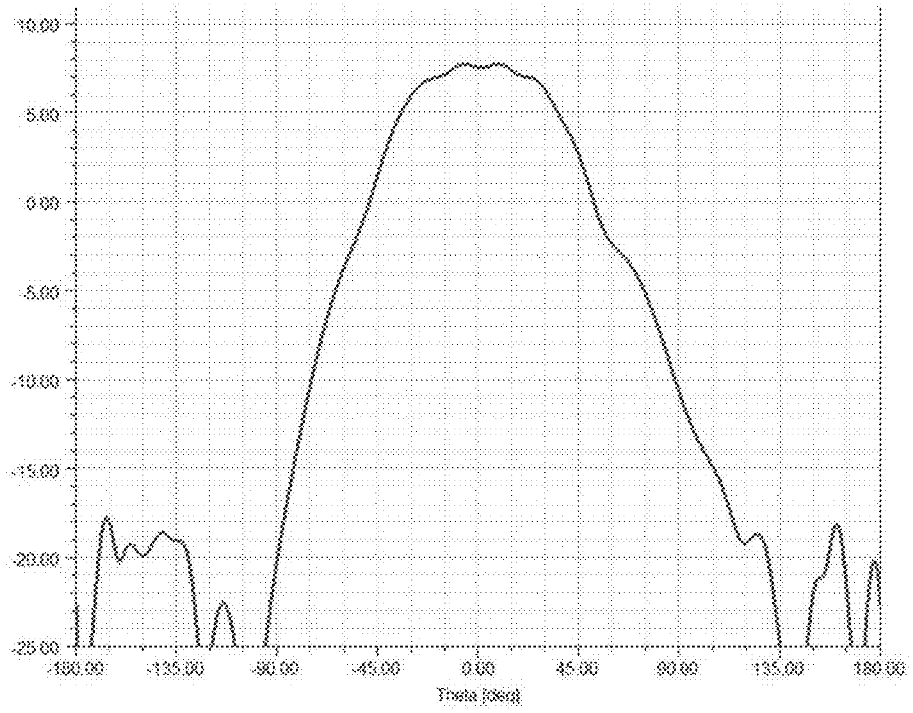
FIG. 10A shows a directivity pattern in Example 1.
Figure 10B:
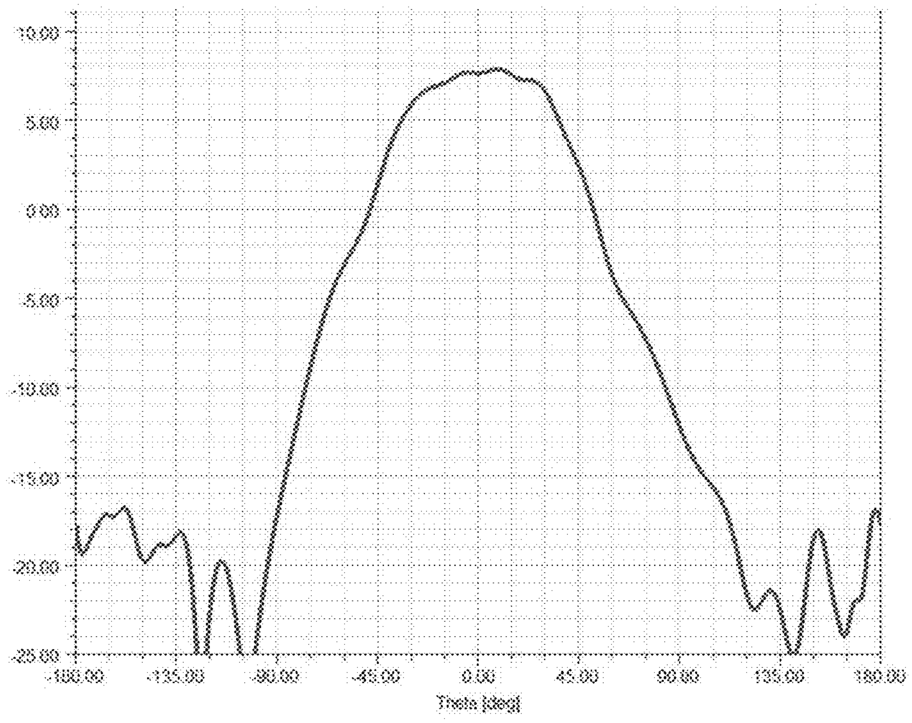
FIG. 10B shows a directivity pattern in Example 2.
Figure 11A:
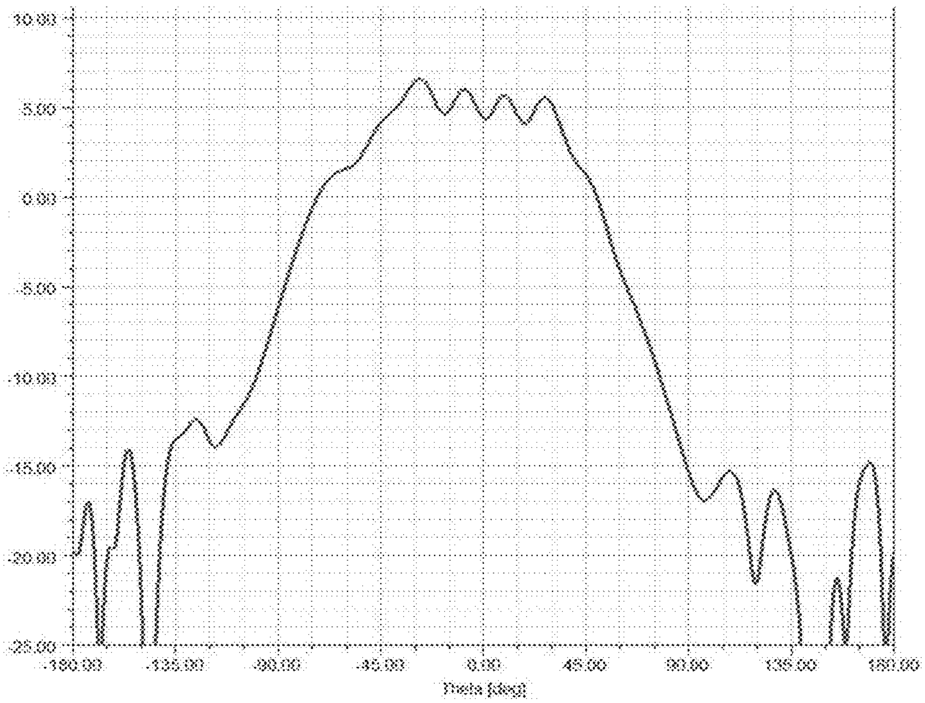
FIG. 11A shows a directivity pattern in Example 3.
Figure 11B:
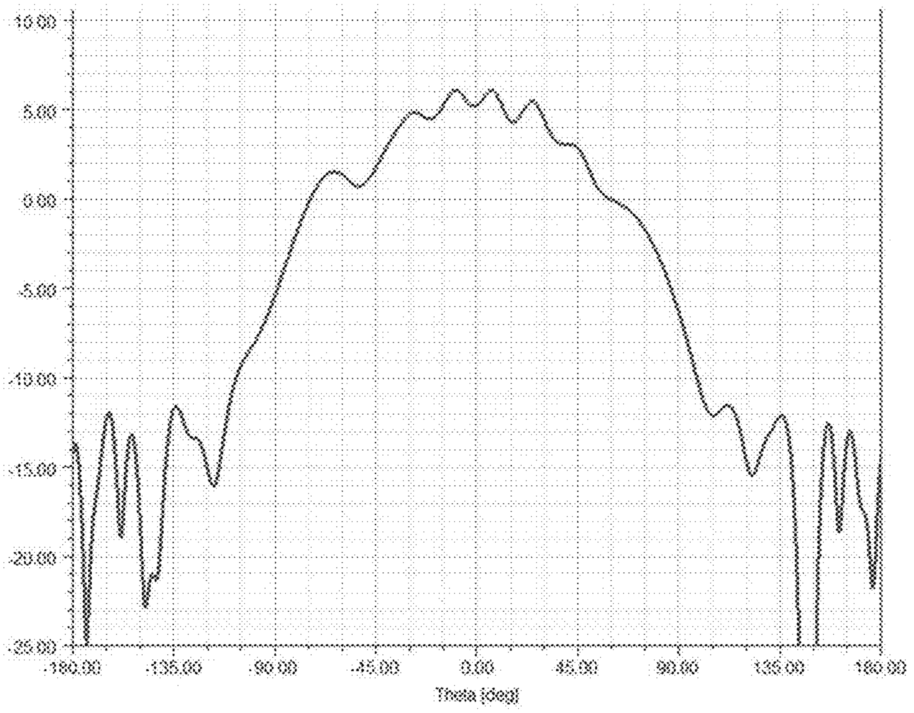
FIG. 11B shows a directivity pattern in Comparative Example.

FIG. 10A shows a directivity pattern in Example 1, FIG. 10B shows a directivity pattern in Example 2, FIG. 11A shows a directivity pattern in Example 3, and FIG. 11B shows a directivity pattern in Comparative Example.

In FIG. 10A, FIG. 10B, FIG. 11A, and FIG. 11B, the vertical axis represents gain, and the horizontal axis represents angle.

With reference to FIG. 11B, in the range of −90 degrees to 90 degrees, ripples are significantly observed.

In contrast, with reference to FIG. 11A, it is seen that a drop in the gain near −50 degrees observed in FIG. 11B is mitigated in FIG. 11A.

With reference to FIG. 10A and FIG. 10B, hardly any ripples are observed in the range of −90 degrees to 90 degrees.

From these results, it is seen that when the EBG structure 20 is appropriately arranged, the ripple occurring in the directivity pattern of the array antenna 6 can be effectively suppressed.

[Others]

It should be noted that the embodiments disclosed herein are merely illustrative and not restrictive in all aspects.

The scope of the present disclosure is defined by the scope of the claims rather than the above description, and is intended to include meaning equivalent to the scope of the claims and all modifications within the scope.

REFERENCE SIGNS LIST

1 planar antenna
2 dielectric substrate
2*a* first surface
2*b* second surface
4 first ground plate
4*a* base part
4*al* one lateral side
4*a*2 other lateral side
4*b* L-shaped part
4*b*1 edge
4*c* via
4*cl* outer peripheral via
4*c*2 inner via
6 array antenna
8 second ground plate
10 feeding point
12 feed line
12*a* base end
12*b* leading end
12*c* first lateral side
12*d* second lateral side
14 radiation element
14*a* first radiation element
14*al* leading edge
14*b* first radiation element
14*b*1 leading edge
14*c* first radiation element
14*h* second radiation element
14*h*1 leading edge
14*i* second radiation element
14*i*1 leading edge
20 electromagnetic band gap structure
22 unit cell
24 via
30 arrangement region
31 first arrangement region
32 second arrangement region
33 third arrangement region
41 first adjacent region
42 second adjacent region
B band-shaped region
C imaginary center line
D interval
I1 first imaginary line
I2 second imaginary line
I3 third imaginary line
I4 fourth imaginary line
L1 straight line
g gap
w1 interval
w2 interval

The invention claimed is:

1. A planar antenna comprising:

a dielectric substrate;

a feed line provided on a first surface of the dielectric substrate and having a first lateral side extending along a first direction and a second lateral side opposed to the first lateral side;

three or more radiation elements arrayed on the first surface along the first direction and provided at the first lateral side and the second lateral side so as to alternately protrude; and an electromagnetic band gap structure having an arrangement region on the first surface, wherein the first surface includes a first adjacent region adjacent to the first lateral side and a second adjacent region adjacent to the second lateral side, the arrangement region includes a first arrangement region included in the first adjacent region and a second arrangement region included in the second adjacent region, the first arrangement region is defined by a perimeter of the electromagnetic band gap structure in the first adjacent region, the second arrangement region is defined by a perimeter of the electromagnetic band gap structure in the second adjacent region, the three or more radiation elements include a plurality of first radiation elements protruding from the first lateral side toward the first adjacent region, and one or a plurality of second radiation elements protruding from the second lateral side toward the second adjacent region, at least a part of the first arrangement region is positioned closer to the feed line with respect to a first imaginary line below, and at least a part of the second arrangement region is positioned closer to the feed line with respect to a second imaginary line below, the first imaginary line: a straight line parallel to the first direction and passing through the first adjacent region, an interval between the straight line and an imaginary center line below being twice w1 below, the second imaginary line: a straight line parallel to the first direction and passing through the second adjacent region, an interval between the straight line and the imaginary center line being twice w2 below, the imaginary center line: a straight line parallel to the first direction and passing through a center, in a second direction orthogonal to the first direction, of the feed line, the w1: an interval between the imaginary center line and a leading edge of the plurality of first radiation elements, and the w2: an interval between the imaginary center line and a leading edge of the one or the plurality of second radiation elements.

2. The planar antenna according to claim 1, wherein at least a part of the first arrangement region is positioned closer to the feed line with respect to a third imaginary line below, and at least a part of the second arrangement region is positioned closer to the feed line with respect to a fourth imaginary line below, the third imaginary line: a straight line parallel to the first direction and passing through the leading edge of the plurality of first radiation elements, and the fourth imaginary line: a straight line parallel to the first direction and passing through the leading edge of the one or the plurality of second radiation elements.

3. The planar antenna according to claim 2, wherein a part of the first arrangement region is positioned between the plurality of first radiation elements.

4. The planar antenna according to claim 2, wherein a maximum value of a width dimension along the second direction of the first arrangement region is larger than a maximum value of a width dimension along the second direction of the plurality of first radiation elements, and a maximum value of a width dimension along the second direction of the second arrangement region is larger than a maximum value of a width dimension along the second direction of the one or the plurality of second radiation elements.

5. The planar antenna according to claim 1, wherein the arrangement region further includes a third arrangement region connecting the first arrangement region and the second arrangement region so as to surround the feed line.

6. The planar antenna according to claim 2, wherein a part of the second arrangement region is positioned between the one or the plurality of second radiation elements.

7. The planar antenna according to claim 2, wherein the third imaginary line is a straight line parallel to the first direction and passing through a leading edge farthest from the imaginary center line out of leading edges of the plurality of first radiation elements.

8. The planar antenna according to claim 2, wherein the fourth imaginary line is a straight line parallel to the first direction and passing through a leading edge farthest from the imaginary center line out of leading edges of the one or the plurality of second radiation elements.

9. The planar antenna according to claim 1, wherein the w1 is an interval between the imaginary center line and a leading edge farthest from the imaginary center line out of leading edges of the plurality of first radiation elements.

10. The planar antenna according to claim 1, wherein the w2 is an interval between the imaginary center line and a leading edge farthest from the imaginary center line out of leading edges of the one or the plurality of second radiation elements.

11. The planar antenna according to claim 1, wherein each radiation element has a rectangular shape.

12. The planar antenna according to claim 1, wherein the electromagnetic band gap structure includes a plurality of unit cells arrayed on the first surface.

13. The planar antenna according to claim 12, wherein the first arrangement region and the second arrangement region each include a subset of the plurality of unit cells.

14. The planar antenna according to claim 13, wherein the perimeter of the electromagnetic band gap structure in the first adjacent region is determined by outer edges of unit cells of the subset of the first arrangement region positioned at an outer edge of the electromagnetic band gap structure in the first adjacent region, and the perimeter of the electromagnetic band gap structure in the second adjacent region is determined by outer edges of unit cells of the subset of the second arrangement region positioned at an outer edge of the electromagnetic band gap structure in the second adjacent region.

15. The planar antenna according to claim 12, wherein the plurality of unit cells are conductive patterns arranged on the first surface with a gap between adjacent unit cells.

16. The planar antenna according to claim 15, wherein the first arrangement region and the second arrangement region each include a subset of the conductive patterns.

17. The planar antenna according to claim 16, wherein the perimeter of the electromagnetic band gap structure in the first adjacent region is determined by outer edges of conductive patterns of the subset of the first arrangement region positioned at an outer edge of the electromagnetic band gap structure in the first adjacent region, and the perimeter of the electromagnetic band gap structure in the second adjacent region is determined by outer edges of conductive patterns of the subset of the second arrangement region positioned at an outer edge of the electromagnetic band gap structure in the second adjacent region.

* * * * *